United States Patent [19]
Sakakibara et al.

[11] Patent Number: 4,724,711
[45] Date of Patent: Feb. 16, 1988

[54] TORQUE DETECTOR

[75] Inventors: Naoji Sakakibara, Chiryu; Takehiko Fushimi, Kariya; Akio Hashimoto; Hiroshi Naito, both of Toyota, all of Japan

[73] Assignee: Aisin Seiki Kabushiki Kaisha, Aichi, Japan

[21] Appl. No.: 903,320

[22] Filed: Sep. 3, 1986

[30] Foreign Application Priority Data

Sep. 3, 1985 [JP] Japan .................. 60-194557
Jan. 6, 1986 [JP] Japan .................. 61-000442
Mar. 29, 1986 [JP] Japan .................. 61-071963

[51] Int. Cl.⁴ ............................................. G01L 3/14
[52] U.S. Cl. ............................. 73/862.33; 180/79.1
[58] Field of Search ........... 73/862.19, 862.33, 862.35, 73/862.49, 862.32, 781; 180/79.1

[56] References Cited

U.S. PATENT DOCUMENTS

| | | | |
|---|---|---|---|
| 1,204,292 | 11/1916 | McCormick | 73/862.32 |
| 2,472,047 | 5/1949 | Ruge | 73/862.65 X |
| 2,546,155 | 3/1951 | Haber et al. | 73/781 X |
| 3,082,621 | 3/1963 | Soderholm | 73/855 X |
| 3,104,544 | 9/1963 | Guiot | 73/862.32 |
| 3,683,685 | 8/1972 | Viegelahn | 73/862.33 X |
| 3,722,264 | 3/1973 | Talmo et al. | 73/781 X |
| 3,805,600 | 4/1974 | Powell et al. | 73/855 X |
| 4,343,197 | 8/1982 | Suzuki et al. | 73/855 X |
| 4,509,375 | 4/1985 | Davis | 73/862.32 |
| 4,621,701 | 11/1986 | Takabayashi et al. | 73/862.33 X |

Primary Examiner—Charles A. Ruehl
Attorney, Agent, or Firm—Sughrue, Mion, Zinn, Macpeak & Seas

[57] ABSTRACT

A torque detector is provided, which functions in such a manner that as torque is applied between an input shaft and an output shaft, an angular displacement is produced between the input shaft and the output shaft, this angular displacement is converted into an axial displacement by means of a torque-axial displacement converting mechanism to bend a cantilever fixed between a housing and the torque-axial displacement converting mechanism, by means of a strain gage attached to the cantilever the deformation of the cantilever is converted into a change of electric resistance, and by causing a current to flow through the strain gage the torque applied between the input shaft and the output shaft is converted into a voltage.

15 Claims, 20 Drawing Figures

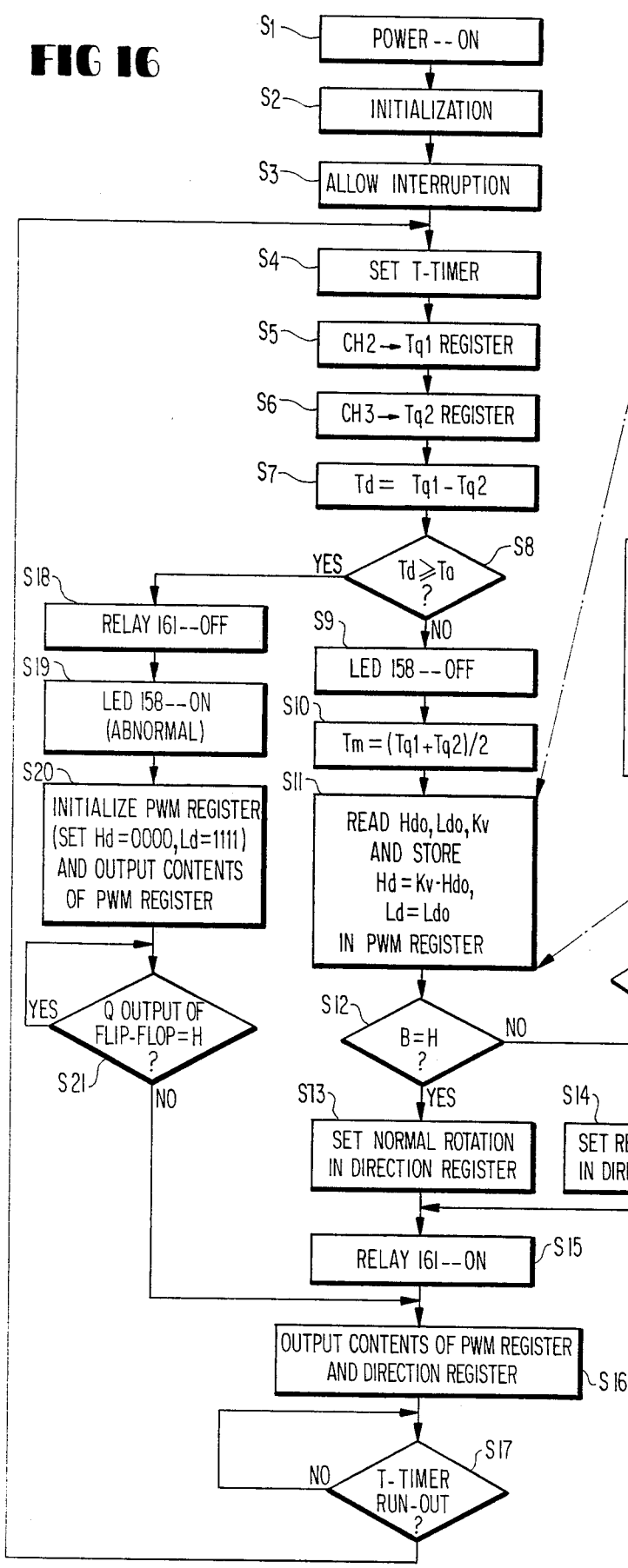
FIG 16
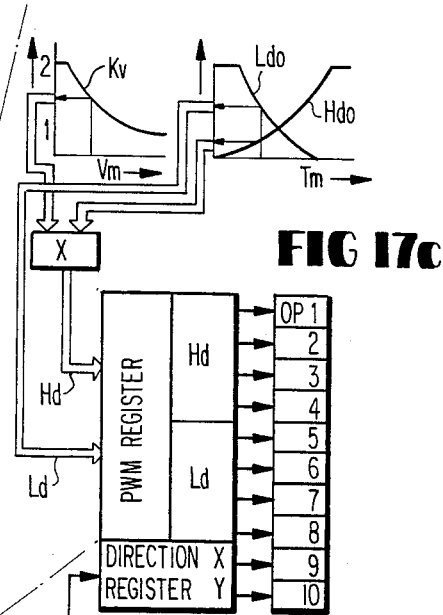
FIG 17a  FIG 7b
FIG 17c
AT B=H, X=L,
  Y=H: NORMAL ROTATION
AT B=L, X=H,
  Y=L: REVERSE ROTATION

TORQUE DETECTOR

BACKGROUND OF THE INVENTION

1. Field of the Invention

This invention relates to a torque detector which detects torque by converting the torsion of a mechanism for producing an angular displacement, such as a torsion bar, into a change of voltage and more particularly, to the type using a strain gage.

2. Description of the Prior Art

Up to now a number of torque detectors have been disclosed, these being classified roughly into three types.

The first is the magnetic type torque detector which detects a magnetic change produced on a torsion bar by application of torque. This type of torque detector is disclosed, for example, in U.S. Pat. No. 4,506,554. Although the magnetic type torque detector can detect a torque applied to the torsion bar by the use of a magnetic sensor such as a coil without making contact with the torsion bar, it has the problem that an electric circuit becomes complicated.

The second is the electrostatic type torque detector which detects torque by converting an angular displacement produced on the torsion bar by application of torque into a change of electrostatic capacity. This type of torque detector is disclosed, for example, in U.S. Pat. No. 4,522,278. Although the electrostatic type torque detector can detect a torque applied to the torsion bar, a change of electrostatic capacity is generally small, so that there is the problem that it is not only in need of a precise electronic circuit, but also apt to be influenced by a change of surroundings such as humidity.

The third is the resistance type torque detector which detects torque by converting an angular displacement produced on the torsion bary by application of torque into a change of electric resistance. Torque detectors of this type are further classified roughly into two types: one using a potentiometer and the other using a strain gage. The torque detector using the potentiometer is disclosed, for example, in Japanese Patent Laid-Open No. 58-177773. The torque detector using the strain gage is disclosed, for example, in Japanese Patent Laid-Open No. 59-2099644. The resistance type torque detector has the problem that the durability is poor because the potentionmeter or strain gage causes a secular change.

SUMMARY OF THE INVENTION

It is a first object of the present invention to provide a torque detector devoid of the aforementioned traditional defects.

It is a second object of the present invention to provide a torque detector using strain gauges on a cantilever which is easily exchangeable.

It is a third object of the present invention to provide a torque detector of low cost and high reliability.

To achieve the foregoing first through third objects, the present invention provides a torque detector which comprises a torque-axial displacement converting mechanism for converting a steering torque appearing between an input shaft and an output shaft into an axial displacement, a housing for accommodating the torque-axial displacement converting mechanism, a cantilever having one end fixed to the housing with the other end supported by the torque-axial displacement converting mechanism, and at least one strain gage attached to the cantilever.

BRIEF DESCRIPTION OF THE DRAWINGS

FIG. 16 is a flowchart showing the outline of the control operation of a micro processor 147 shown in FIG. 15;

FIGS. 17a and 17b are graphs typically showing data stored in an internal ROM of the micro processor 147;

FIG. 17c is a plan view showing the correlation between the data of internal registers of the micro processor 147 and ports to which the data are output.

DESCRIPTION OF THE PREFERRED EMBODIMENTS

Embodiments of the present invention will now be described with reference to the drawings.

Figure 1:
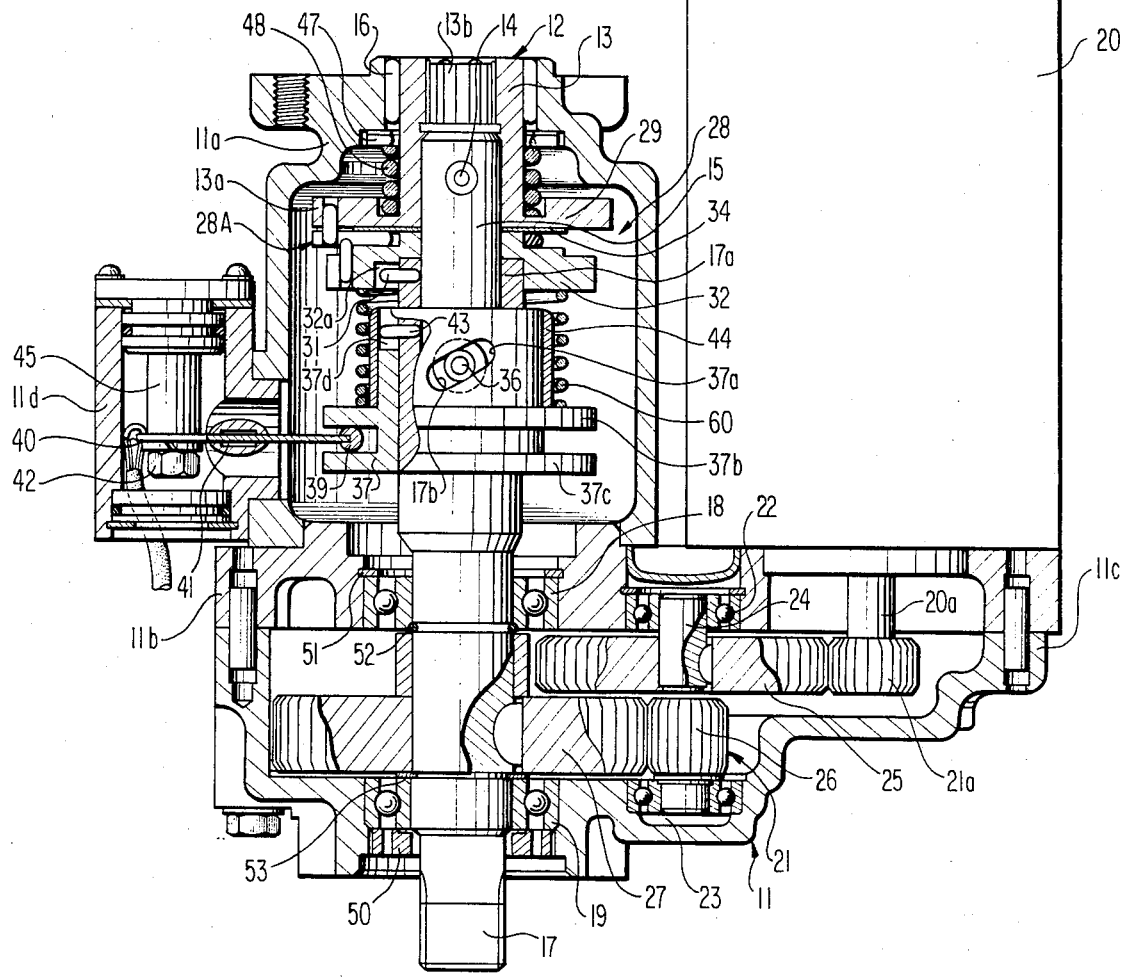
FIG. 1 is a sectional view of an apparatus using a torque detector according to the present invention.

In FIG. 1, a housing 11 is fixed to a vehicle, which is made up of divided portions 11a, 11b, 11c, and 11d coupled together by means, for example, of screw bolts or welded mutually into a single body.

An input shaft 12 provided inside the housing 11 is composed of a hollow shaft body 13 having a flange 13a formed on the outer periphery of its lower end and a connection shaft body 15 fitted in the hole of the hollow shaft body 12 and coupled integrally therewith by means of a radially-extending coupling pin 14. The upper end portion of the hollow shaft body 13 is rotatably supported by the housing 11 via a needle bearing 16. The hollow shaft body 13 has a spline 13b formed in the upper portion of its inner wall to be coupled with a steering shaft not shown.

An output shaft 17 provided inside the housing 11 has a cylindrical hole 17a formed in its upper end portion into which the lower portion of the connection shaft body 15 is loosely inserted, the central portion and the lower end portion of which are rotatably supported by the housing portions 11b and 11c via ball bearings 18 and 19, respectively.

Inside the lower housing portion 11c of the housing 11 is disposed a reduction gear unit 21 for transmitting the output of an electric motor 20 fixed in the housing portion 11c from a motor output shaft 20a to the output shaft 17, which reduces the rotation speed of the motor 20 by means of a required number of gears. This reduction gear unit 21 is composed of a gear 21a coaxial with the motor output shaft 20a, gears 25 and 26 attached to a shaft 24 rotatably supported by the housing portions 11b and 11c via ball bearings 22 and 23, respectively, and a gear 27 coaxial with the output shaft 17.

Figure 2:
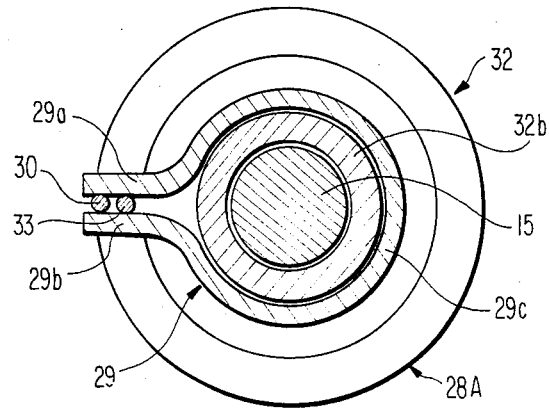
FIG. 2 is a sectional view showing the important portion of the torque detector according to the present invention.

Inside the upper housing portion 11a of the housing 11 is disposed a torque-axial displacement converting mechanism 28 which produces a torsional angular displacement corresponding to the torque of the input shaft 12 between the two shaft bodies thereof. This torque-axial displacement converting mechanism 28 is composed of a torque balance detecting section 28A (see FIG. 2) and an axial converting means 28B (see FIG. 3).

The torque balance detecting section 28A is fundamentally composed of a spring 29 which is made of a spring wire rod shaped substantially into the form of a letter "C", a pin 30 fixed to the flange 13a of the hollow shaft body 13 and pinched between the mutually-parallel end portions 29a and 29b of the spring 29, and a pin 33 fixed to a plate 32; having a groove 32a in which a pin 31 fixed to the output shaft 17 is inserted vertically slidably and rotatable integrally with the output shaft 17; and pinched between the two end portions 29a and 29b of the spring 29. The plate 32 has a boss portion 32a being guided by the arcuate portion 29c of the spring 29 between the two end portions thereof. Between the spring 29 and the lower end surface of the hollow shaft body 13 is interposed a washer 34.

In the torque balance detecting section 28A of the foregoing configuration, when no torque is applied to the input shaft 12, the spring 29 is restored to the original state wherein the two end portions pinch the pins 30 and 33 therebetween and are closest to each other, and the input shaft 12 and the output shaft 17 takes a neutral positional relation where the torsional angular displacement is zero. If torque is applied to the input shaft 12, it acts so as to separate the two end portions 29a and 29b of the spring 29 from each other, and owing to the elastic deformation of the spring 29 a torsional angular displacement corresponding to the torque of the input shaft 12 is produced between the input shaft 12 and the output shaft 17.

Figure 3:
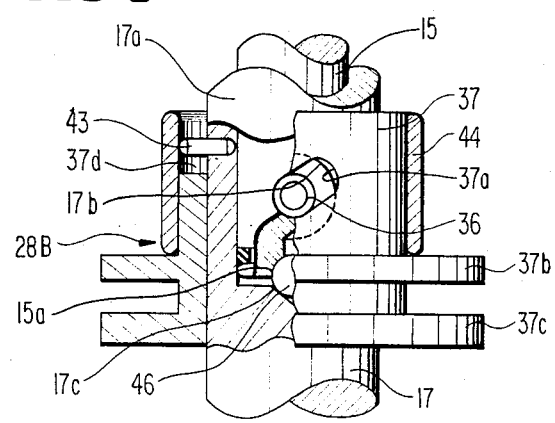
FIG. 3 is a sectional view showing a displacement member according to the present invention.

Below the torque balance detecting section 28A is disposed the axial converting means 28B. This axial converting means 28B is, as shown in FIGS. 1 and 3, composed of a pin 36 fixed to the lower end portion of the connection shaft body 15 of the input shaft 12 and extending radially through a spill port 17b formed in the output shaft 17, a slide member 37 slidably fitted on the upper end portion of the output shaft 17 and having a long hole 37a in which the pin 36 is slidably fitted, and an upper flange 37b and a lower flange 37c provided at the lower end of the slide member 37, the slide member 37 having further a slot 37d oriented in the direction of the output shaft 17 in which a radially-extending pin 43 fixed to the output shaft 17 is slidably fitted.

Apparently, the slide member 37 is shiftable vertically with respect to the output shaft 17 by means of the pin 43 and the slot 37d, but cannot rotate. On the slide member 37 is fitted a cylinder body 44 for preventing the pins 36 and 43 from coming off.

The long hole 37a of the slide member 37 is oriented in the direction of a spiral, so that when the torsional angular displacement between the input shaft 12 and the output shaft 17 is zero, the pin 36 is positioned at the center between the ends of the long hole 37a, whereas when some torsional angular displacement is produced between the input shaft 12 and the output shaft 17, owing to contact between the peripheral surface of the pin 36 and the side surface of the long hole 37a, the slide member 37 is displaced on the output shaft 17 in the direction of the axis thereof in proportion to the extent of torsional angular displacement by means of the cam action, and the upper flange 37b and lower flange 37c are displaced.

Between the upper flange 37b and the lower flange 37c is held a cylindrical shaft 39 provided on the free end of a cantilever 40. The other end of the cantilever 40 is tightly screwed by a screw bolt 42 to an attaching base body 45 fixed to the housing portion 11d. As shown in the drawing, the attaching base body 45 seals up the housing portion 11d by the aid, for example, of an O-ring, and the cantilever 40 is secured with interposition of a washer, for example, by means of the screw bolt 42 so that it is accurately positioned and tightly attached.

Figure 4:
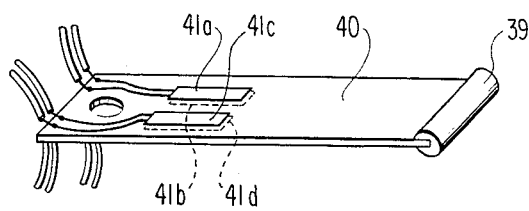
FIGS. 4, 5, and 6 are perspective views showing displacement detectors according to the present invention.

As shown in the perspective view of FIG. 4 illustrating the relation between the cantilever and the cylindrical shaft, on the cantilever 40 are formed strain gages 41a, 41b, 41c, and 41d forming a resistance bridge which are provided on either side of the half portion on the side of a hole for attaching the screw bolt 42, in such a way that when no displacement is applied to the free end of the cantilever 40 the output of strain gages 41a, 41b, 41c, and 41d forming the resistance bridge becomes minimum, whereas when a maximum displacement is applied to the free end of the cantilever 40 the output of strain gages 41a, 41b, 41c, and 41d forming the resistance bridge becomes minimum. Of course, the cylindrical shaft 39 attached to the free end of the cantilever 40 is configured so that its contact resistance is small with respect to the displacement of the upper flange 37b and lower flange 37c of the slide member 37. For reference, in the embodiment, the material of the cantilever 40 is phosphor bronze, its surface is coated with an insulating layer, on this insulating layer are formed the strain gages 41a, 41b, 41c, and 41d in the form of a thin film circuit by, for example, the process of sputtering, and these gages are connected with lead wires on the side of the fixed end. The surface of strain gages 41a, 41b, 41c, and 41d is applied with a dampproofing coating to block an influence of oil or humidity, and further coated with silicone rubber, for example.

Figure 5:
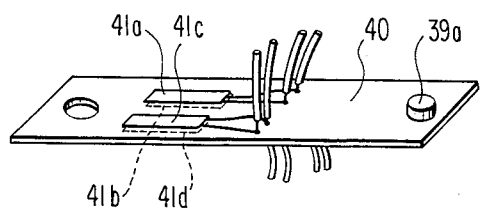

FIG. 5 is a perspective view of another embodiment of the cantilever, in which a steel ball 39a is provided at the free end of the cantilever 40 and on the opposite side are bonded the strain gages 41a, 41b, 41c, and 41d by the use of an adhesive agent such as thermosetting adhesives. The surface of strain gages 41a, 41b, 41c, and 41d is treated in a similar manner to the case of FIG. 4.

Figure 6:
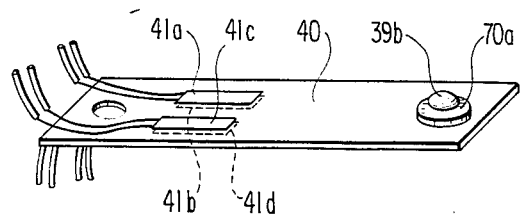

FIG. 6 is a perspective view of still another embodiment of the cantilever, in which a steel ball 39b is held at the free end of the cantilever 40 by calking and coupling its first base 70a and second base 70b together. The strain gages 41a, 41b, 41c, and 41d are bonded by the use of an adhesive agent such as thermosetting adhesives on the side opposite to the free end of the cantilever 40. The surface of strain gages 41a, 41b, 41c and 41d is treated in a similar manner to the case of FIG. 4.

The cantilever shown in FIG. 6 is attached in the manner described below.

Figure 7:
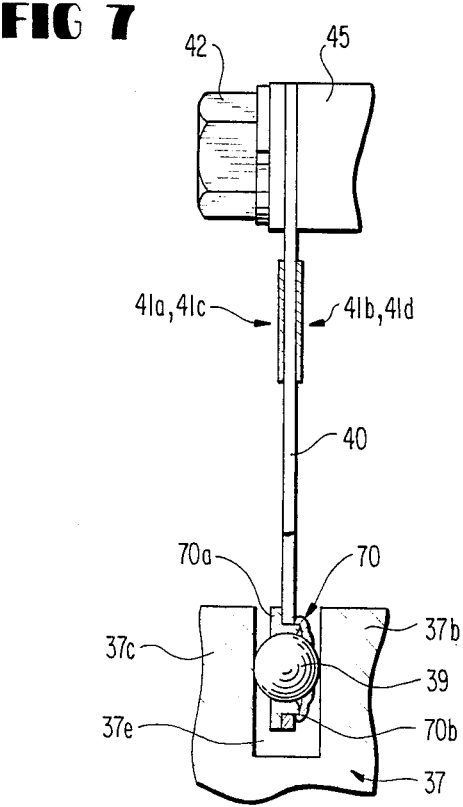
FIGS. 7 and 8 are sectional views each showing the important portion of a connection section between the displacement detector and the displacement member according to the present invention.

As shown in FIG. 7, in a slide groove 37e between the upper flange 37b and the lower flange 37c is held the steel ball 39 which is held at the free end of the cantilever 40 by calking and coupling its first base 70a and second base 70b together, so that the contact resistance of the cantilever is made small with respect to the displacement of the upper flange 37b and lower flange 37c of the slide member 37 by means of the steel ball 39.

The other end of the cantilever 40 is tightly screwed to the attaching base body 45 fixed to the housing portion 11d by means of the screw bolt 42. As shown, the attaching base body 45 seals up the housing portion 11d by the aid, for example, of an O-ring, and the cantilever 40 is accurately positioned and tightly attached by screwing the screw bolt 42 with interposition of a washer, for example.

Figure 8:
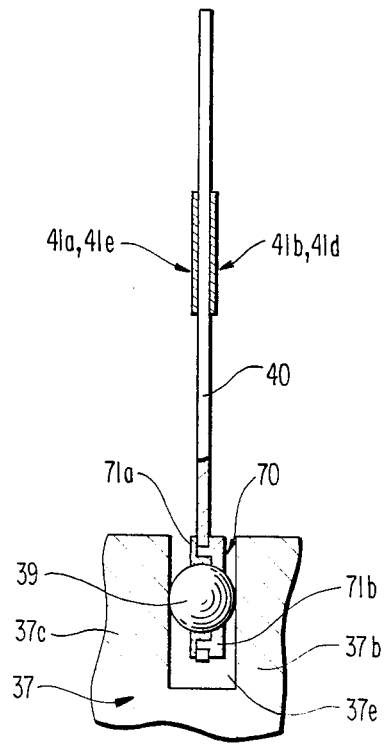

FIG. 8 is a sectional view of another embodiment of the means for holding the steel ball of the cantilever, in which the steel ball 39 is held by screwing its first flange 71a and second flange 71b to the free end of the cantilever 40, and on the opposite side are bonded the strain gages 41a, 41b, 41c, and 41d by the use of an adhesive agent such as thermosetting adhesives.

Since the cantilever 40 shown in FIG. 4 is configured so that its balance in the transverse direction is attained by means of the cylindrical shaft 39, it is possible to make uniform the strains of the strain gages 41a, 41b, 41c, and 41d forming the bridge. Since the cantilever 40 shown in either FIG. 5 or FIG. 6 has the steel ball 39a, 39b, pinched between the upper flange 37b and the lower flange 37c, its contact resistance can be made minimum.

Figure 9:
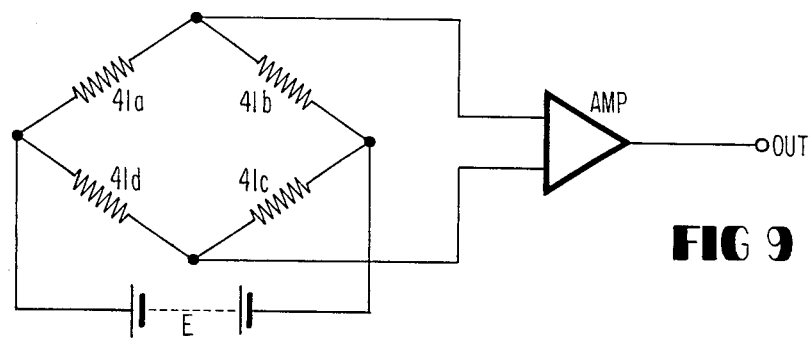
FIG. 9 is a circuit diagram showing a strain detecting circuit used in the displacement detector according to the present invention.

FIG. 9 shows a known strain detecting circuit for connecting the strain gages 41a, 41b, 41c, and 41d into the form of the bridge circuit and taking out the output thereof.

Figure 10:
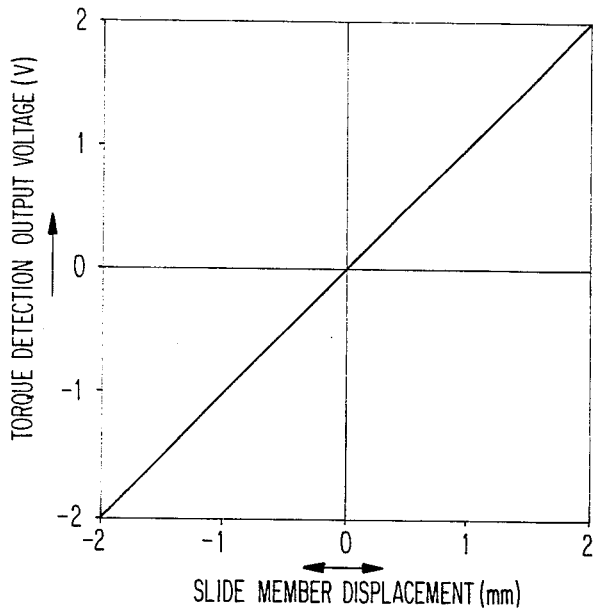
FIG. 10 is a characteristic graph showing the characteristic of detection output voltage of the strain detecting circuit used in the displacement detector according to the present invention.

In FIG. 9, E designates a constant voltage source, and AMP designates an amplifier circuit. FIG. 10 shows the relation between the torque detection output voltage pertinent to the input shaft 12 and the extent of vertical displacement of the slide member 37. Of course, the vertical displacement of the slide member 37 and the torque detection output voltage can be set arbitrarily by selecting the amplification factor of the amplifier circuit AMP, bias voltage, resistance of the strain gage, etc.

In the embodiment described above, the gap between the outer periphery of the pin 36 fixed to the connection shaft body 15 coupled integrally with the input shaft 12 via the coupling pin 14 and the long hole 37a of the slide member 37 may influence the corresponding relation between the torsional angular displacement between the input shaft 12 and the output shaft 17 and the axial displacement of the slide member 37. However, such an influence can be eliminated by interposing a compression spring 60 between the upper flange 37b of the slide member 37 and the plate 32 to thereby urge the slide member 37 downward so that the outer periphery of the pin 36 can contact only with the upper side surface of the long hole 37a.

Further, in order to make a vertical relative displacement (backlash) disappear from between the input shaft 12 and the output shaft 17 and to prevent the slidability between the pin 36 and the long hole 37a from becoming worse and the degree of balance between the upper flange 37b and lower flange 37c of the slide member 37 and the cantilever 40 whose free end is supported via the steel ball 39 between these flanges also from becoming worse: these deterioration would result from twisting appearing between the two shafts 12 and 17 that would be caused owing to the gap between the fitted portions of these shafts, as shown in FIG. 3, a tapered recess 15a is formed at the center of the lower end surface of the connection shaft body 15 coupled integrally with the input shaft 12 via the coupling pin 14, another tapered recess 17c is formed at the center of the bottom surface of the fit hole 17a of the output shaft 17, a steel ball 46 is interposed between these tapered recesses 15a and 17c, and a compression spring 48 is provided whose upper end is received by the inside of the housing portion 11a via a needle bearing (a thrust bearing) 47 on the upper side of the flange 13a of the hollow shaft body 13 of the input shaft with the lower end received by the flange 13a, so that the input shaft 12 is pushed against the output shaft 17 via the steel ball 46 by means of the compression spring 48.

Additionally, in FIG. 1, 50 designates a stop ring screwed to the housing, and 51, 52, and 53 designate snap rings.

The operation of the embodiment thus configured of a steering torque detector according to the present invention will now be described.

First, as a driver applies a steering torque to the input shaft 12, by the resilient force of the spring 29 forming the torque balance detecting section 28A there is produced a relative angular displacement corresponding to the torque of the input shaft 12 between the input shaft 12 and the output shaft 17, this angular displacement causes a displacement in the axial direction of the slide member 37 forming the axial converting means 28B, and the displacement of the slide member 37 changes into a displacement of the free end of the cantilever 40, so that by means of the strain gages 41 of the cantilever 40 there can be obtained a torque detection signal output indicative of the magnitude and direction of the torque applied to the input shaft 12.

Therefore, it is possible to use this torque detection signal output as an output for a controller of an electric power steering system, to supply power to the motor 20 in accordance with the output of the controller, and to apply the turning force of the motor 20 via the reduction gear unit 21 to the output shaft 17.

Although the foregoing embodiment uses the torque balance detecting section and axial converting means as the torque-axial displacement converting mechanism to convert the steering torque into the axial or vertical displacement, in practicing the present invention it should not be limited to the embodiment described herein, and a means is sufficient for converting the steering torque into a displacement of reciprocating action, preferably, into an axial displacement proportional to the steering torque.

Further, since the slide member forming the torque-axial displacement converting mechanism moves in the axial direction in response to the torque of the means for converting into the axial displacement, if the input shaft or output shaft is made in the form of a ball screw and the torque-axial displacement converting mechanism is made by a mechanism in which the ball screw rotates in response to torque, the slide member can take the form of a nut-like member fitting on the ball screw, or of a member engaging with a ball screw portion.

Furthermore, although the housing of the foregoing embodiment is divided into four, it should not be limited to such a configuration in practicing the present invention. Particularly, although the housing portion 11d has the opening portion designed so as to permit the cantilever to be taken out freely, it may be combined integrally with a different housing portion of the cantilever is removable freely.

Figure 11:
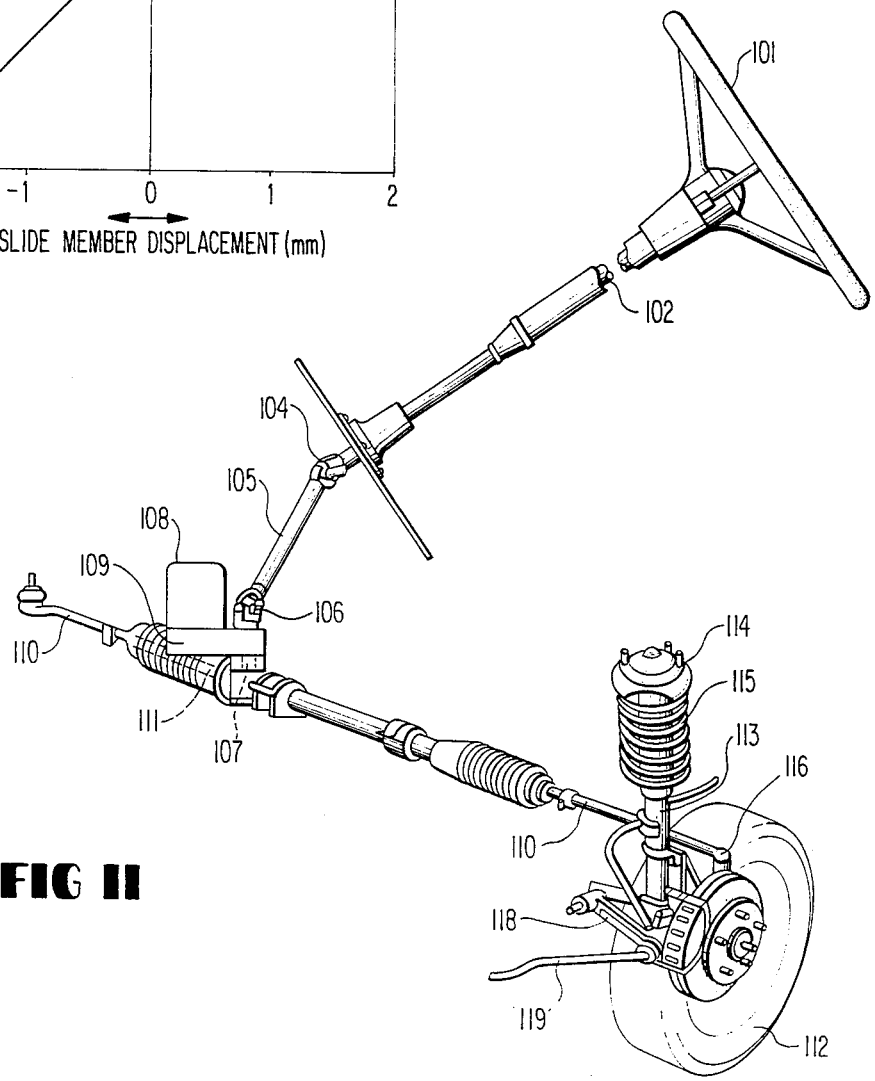
FIG. 11 is a perspective view showing the configuration outline of the mechanical structure of one embodiment according to the present invention.

FIG. 11 illustrates the structural outline of the mechanical section of another embodiment of the present invention. A first steering shaft 102 to which a steering wheel 101 is fixed is coupled via a first universal joint 104 to a second steering shaft 105. The second steering shaft 105 is coupled via a second universal joint 106 to a rod 107. This rod 107 is coupled to the output shaft of a reduction gear unit 109. The input shaft of the reduction gear unit 109 is coupled to the rotary shaft of an electric motor 108. The output shaft of the reduction gear unit 109 is in gear with a rack (111, in FIG. 12) fixed to a toe bar 110. The toe bar 110 is coupled to a steering knuckle arm 116 of a wheel 112. To the axle of the wheel 112 is coupled a shock absorber 113, and to a suspension upper support 114 of the shock absorber 113 is coupled a chassis (not shown). 115 designates a vibration buffering coil spring disposed between the upper support 114 and the wheel, 118 designates a lower suspension arm, and 119 designates a stabilizer bar.

Figure 12:
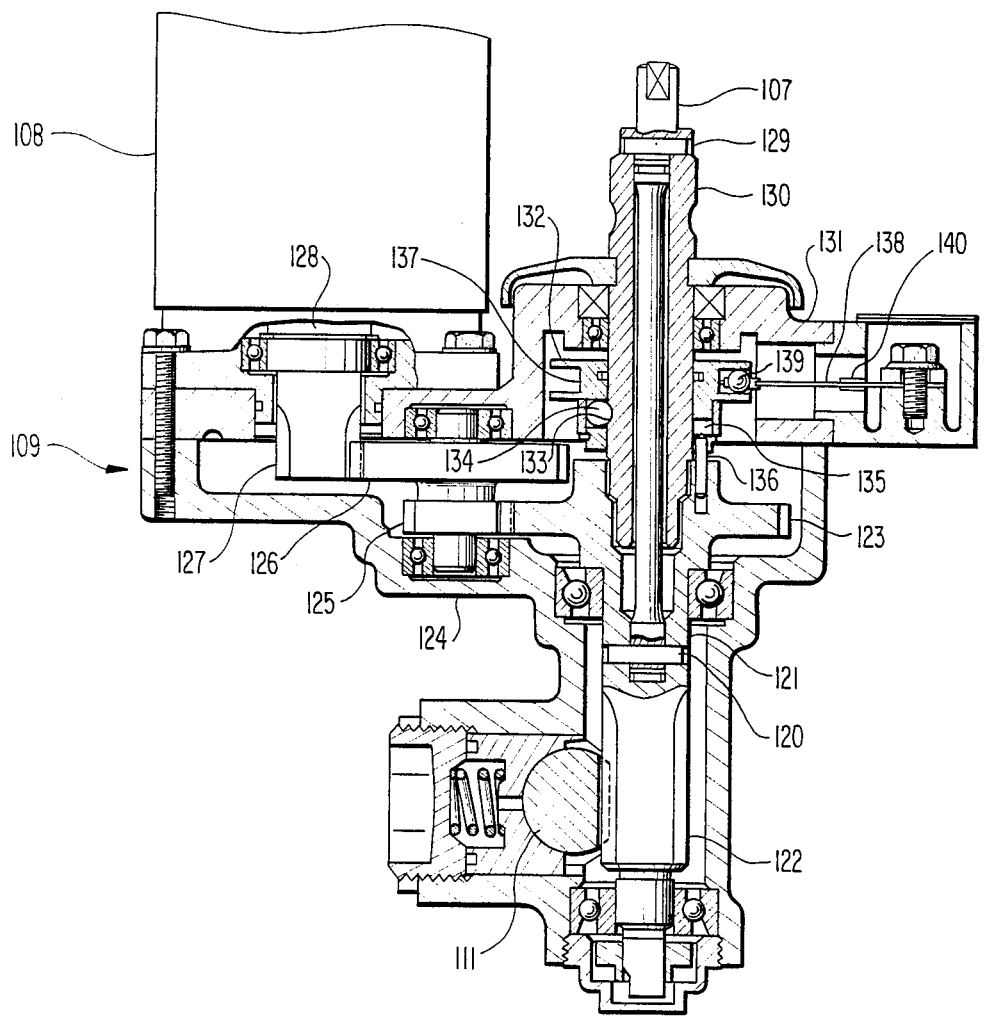
FIG. 12 is an enlarged sectional view of a reduction gear unit 109 shown in FIG. 11, taken along line II—II of FIG. 13.
Figure 13:
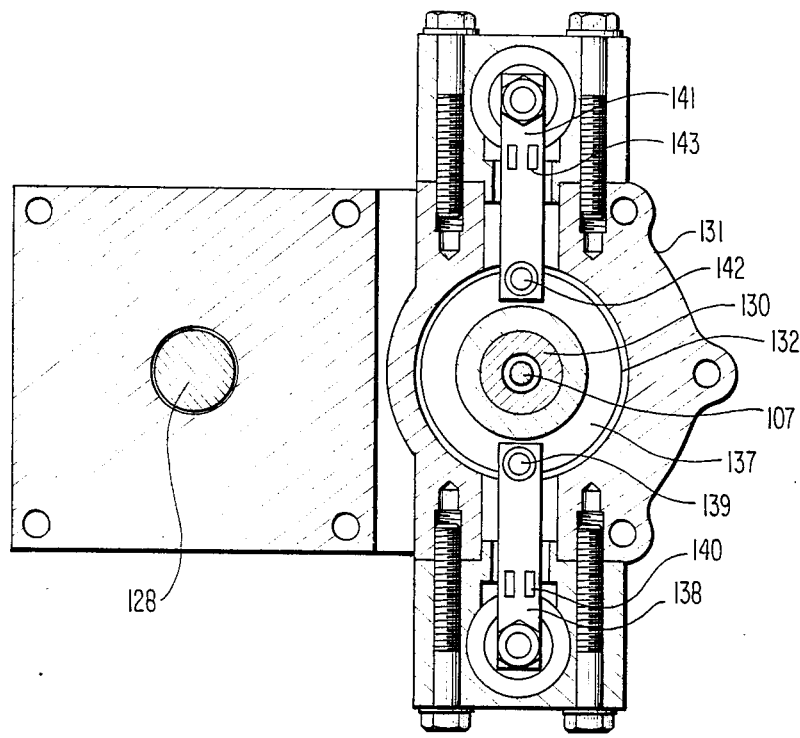
FIG. 13 is a sectional view taken along line III—III of FIG. 12.

The internal structure of the reduction gear unit 109 is illustrated in FIGS. 12 and 13. The upper end of the rod 107 (FIG. 12) is coupled via the second universal joint 106 (FIG. 11) to the second steering shaft 105 (FIG. 11). To the lower end portion of the rod 107 (FIG. 12) is fixed the output shaft 121 of the reduction gear unit 109 by means of a pin 120. The lower end of the output shaft 121 has a pinion gear 122 formed thereon, and the hollow upper end of the output shaft 121 has an output gear 123 formed thereon. The output shaft 121 is rotatably supported by a reduction gear unit casing 124. By the casing 124 is rotatably supported an intermediate gear 125, this gear 125 being in gear with the output gear 123. Another intermediate gear 126 coaxial and integral with the first-mentioned intermediate gear 125 is in gear with an input shaft gear 127 fixed to the rotary output shaft 128 of the motor 108. As the output shaft 128 of the motor 108 rotates, the output shaft 121 is rotated by means of a train of gears 127, 126, 125, and 123, the rack 111 gearing with the pinion gear 122 formed on the output shaft 121 is driven in the direction perpendicular to the sheet plane of FIG. 12 (in the extending direction of the toe board 110 in FIG. 11), and the direction of the wheel 112 (FIG. 11) is changed.

To the upper end portion of the rod 107 (FIG. 12) is fixed a sleeve 130 by means of a pin 129, this sleeve 130 being rotatably supported by a reduction gear unit casing 131. The rod 107 passes through the sleeve 130 and comes into the output shaft 121, and is fixed at its lower end to the output shaft 121 by means of the pin 120. Therefore, as the steering wheel 101 (FIG. 11) rotates, the output shaft 121 is driven and rotated via the first steering shaft 102, first universal joint 104, second steering shaft 105, second universal joint 106, and rod 107, as a result, the rack 111 gearing with the pinion gear 122 formed on the output shaft 121 is driven in the direction perpendicular to the sheet plane of FIG. 12 (in the extending direction of the toe bar 110 in FIG. 11) and the direction of the wheel 112 (FIG. 11) is changed.

In this way, the direction of the wheel is changed by means of either the rotation of the output shaft 128 of the motor 108 or the rotation of the steering wheel 101.

Figure 14:
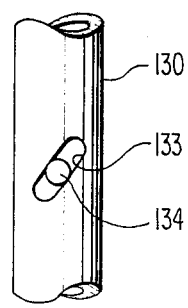
FIG. 14 is a plan view showing the outer surface of a sleeve 130 shown in FIGS. 12 and 13.

On the sleeve 130 is rotatably mounted a wheel 132. That is, the sleeve 130 passes through the wheel 132. As shown in FIG. 14, in the outer surface of the sleeve 130 is formed a round-bottom groove 133 obliquely crossing the center axis of the sleeve 130, and in this round-bottom groove 133 is fitted a ball 134. This ball 134 is supported by the wheel 132. In the wheel 132 is formed a narrow groove 135, and in this groove 135 is inserted the upper end of a pin 136 fixed to the upper end of the output shaft 121. This pin 136 restricts rotation of the wheel 132.

As the rod 107 rotates, the sleeve 130 and the output shaft 121 are rotated; but, because the sleeve 130 is fixed to the upper end of the rod 107 and the output shaft 121 to the lower end of the rod 107, the rod 107 is twisted when the load of the output shaft 121 is large. In proportion to the extent of torsion, the turning angle becomes different between the sleeve 130 and the output shaft 121, and this difference of turning angle is transformed into a difference of turning angle between the sleeve 130 and the wheel 132 because the wheel 132 is caused to rotate together with the output shaft 121 by means of the pin 136. That is, in proportion to this difference of turning angle the sleeve 130 rotates additionally more than the wheel 132, the ball 134 is pushed upward or downward by means of the groove 133 of the sleeve 130 because this groove 133 obliquely crosses the center axis of the sleeve 130, and the wheel 132 supporting the ball 134 is moved upward or downward. The torsion of the rod 107 corresponds to the steering torque applied to the steering wheel 101, and the wheel 132 is moved to an up or down position corresponding to the extent of torsion. Accordingly, the up or down position of the wheel 132 (correctly, the distance it has moved upward or downward from the steering torque=zero position) corresponds to the steering torque.

The wheel 132 has a ring-like groove 137. In this groove 137 are inserted a first ball 139 and a second ball 142. This arrangement is illustrated in FIG. 13.

The first ball 139 is rotatably supported by one end of a first elastic plate 138, whereas the second ball 142 is rotatably supported by one end of a second elastic plate 141 at the symmetrical position with the first ball 139 about the center axis of the rod 107. The other ends of the first and second elastic plates 138 and 141 are fixed at respective positions symmetrical with respect to the center axis of the rod 107.

A first strain gage unit (an electric element whose resistance changes in response to strain) 140 is bonded to the first elastic plate 138, which unit is composed of four strain detecting segments provided two on each side of the first elastic plate 138. Similarly, a second strain gage unit (an electric element whose resistance changes in response to strain) 143 is bonded to the second elastic plate 141, which unit is composed of four strain detecting segments provided two on each side of the second elastic plate 141. A first displacement detecting means composed of the first ball 139, first elastic plate 138, and first strain gage unit 140 is exactly identical in structure to a second displacement detecting means composed of the second ball 142, second elastic plate 141, and second strain gage unit 143, but, differs only in disposition from the former. In either displacement detecting means, the four strain detecting segments are connected into the form of a bridge, and a voltage is taken out as a torque detection signal which corresponds to the difference of resistance between the segments provided on respective sides (since one side receives a compressive stress and the other side a tensile stress, and one signal generated differs in polarity from the other, the difference has a level which is two times the detected level of one side). Accordingly, as the wheel 132 moves upward or downward in response to twisting of the rod 107, the first and second elastic plates 138 and 141 warp upward or downward, as a result, the first and second displacement detecting means generate electric signals indicative of the extent of deviation of the wheel 132 (the extent of deviation from the steering torque=zero position), or the extent of torsion of the rod 107, or the steering torque.

The first and second displacement detecting means are symmetrically disposed, the wheel 132 is of the form of a ring, and the wheel 132 is of the center support type and is supported by the first and second elastic plates, so that the wheel 132 moves up and down smoothly and its posture leans hardly, thus, variations of the detection value of the first and second displacement detecting means caused by tolerance or backlash of a mechanical coupling mechanism provided between the sleeve 130 and the wheel 132 are small, and the detection value stabilizes. If the wheel 132 inclines, the detection signal level of one of the first and second displacement detecting means becomes high with the other detection signal level becoming low. In this case, if the average of these signals is taken as the torque detection value, a more accurate detection value can be obtained.

Figure 15:
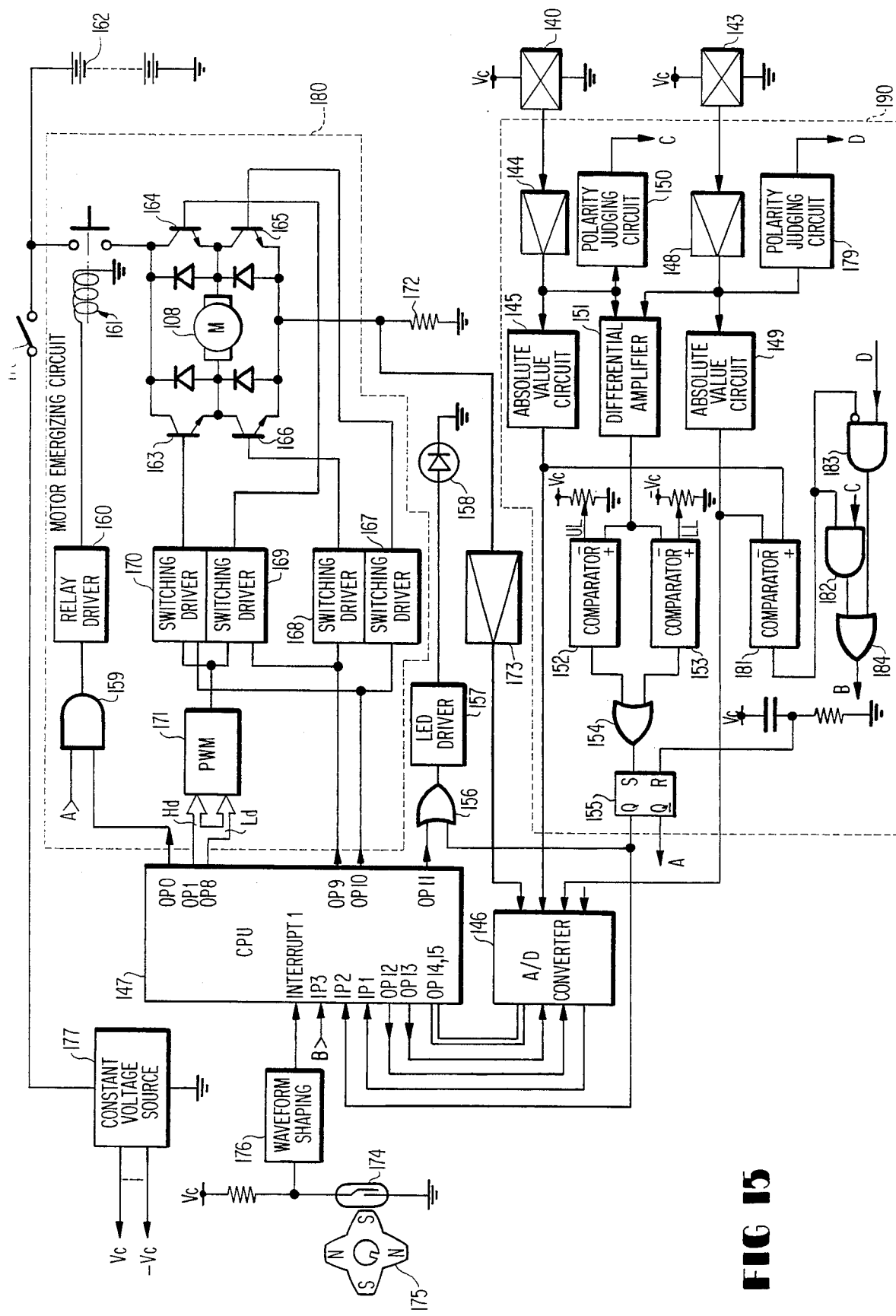
FIG. 15 is a block diagram showing the configuration of an electric control system of the embodiment.

FIG. 15 illustrates the configuration of an electrical control system for energizing the motor 108 on the basis of the detection signals of the first and second displacement detecting means.

The motor 108 is connected with switching transistors 163 through 166 of a motor energizing circuit 180. When both the transistors 163 and 165 are ON, the motor 108 rotates normally, hence, the output shaft 121 is driven to rotate clockwise (this corresponds to the clockwise rotation of the steering wheel 101, or right turn). When both the transistors 164 and 166 are ON, the motor 108 rotates reversely, hence, the output shaft 121 is driven to rotate counterclockwise (this corresponds to the counterclockwise rotation of the steering wheel 101, or left turn). The transistors 165 and 166 are for determining the rotation direction of the motor 108, and the transistors 163 and 164 are for turning ON/OFF the energizing current of the motor 108 at a designated duty to control an effective current value (the time series average of the energizing current by which the output torque of the motor is determined).

The collectors of the transistors 163 and 164 are connected via a relay 161 to the plus terminal of a car battery. The emitters of the transistors 165 and 166 are connected via a resistor 172 for detection of a current to the minus terminal of the car battery (the earth of the apparatus).

A switching driver (a transistor ON/OFF-energizing circuit) 167 turns ON the transistor 165 when an input of high level H is given and keeps the transistor 165 OFF when the input is at a low level L. A switching driver 168 turns ON the transistor 166 when the input of high level H is given and keeps the transistor 166 OFF when the input is of the low level L.

A switching driver 170 turns ON the transistor 163 when the output of a pulse width modulator 171 is H and the input to the driver 167 is H and keeps the transistor 163 OFF when one of these signals is L. A switching driver 169 turns ON the transistor 164 when the output of the pulse width modulator 171 is H and the input to the driver 168 is H and keeps the transistor 164 OFF when one of these signals is L. A relay driver 160 energizes the relay 161 when the output of an AND gate 159 is H to connect the collectors of the transistors 163 and 164 with a battery 162. When the output of the AND gate 159 is L, the relay 161 is deenergized to disconnect the collectors of the transistors 163 and 164 from the battery 162. To the AND gate 159 are applied a relay-ON (energization: H)/OFF (deenergization: L) directive signal from a micro processor 147 and a relay-ON (energization: H)/OFF (deenergization: L) directive signal A from a stop directing circuit 190 hereinafter described. Accordingly, the relay 161 is energized only when the micro processor 147 is directing relay-ON and the stop directing circuit 190 is directing relay-ON.

The pulse width modulator 171 is, in the embodiment a digital timer composed of a preset counter, a clock pulse oscillator, and a controller, and repeats the steps of loading data Hd into the counter, providing an output of high level H (a transistor-ON directive) until the counter generates a carry (count-over of Hd), changing the output to L (a transistor-OFF directive) and loading Ld into the counter when a carry is generated, and loading data Hd into the counter and changing the output to H when the counter generates a carry. That is, the pulse width modulator 171 generates a pulse train of the duty of Hd/(Hd+Ld) in which the level is H during the time interval indicated by data Hd, L during the time interval indicated by data Ld, H during the time interval indicated by data Hd, and so on. For reference, if Hd is zero data, the output of L continues.

Data Hd and Ld specifying the duty are generated by the micro processor 147.

With the first and second strain gage units 140 and 143 is connected the stop directing circuit 190.

The torque detection signal of the first strain gage unit 140 is subjected to a linearization amplification process in an amplifier 144 for filtering and level calibration and applied to an absolute value circuit 145. This absolute value circuit 145 generates a signal (positive polarity) indicative of the absolute level of the output of the amplifier 144, i.e. a signal indicative of the absolute value of the detected torque, and applies to an input channel CH2 of an A/D converter 146. The polarity (plus/minus, corresponding to the rotation direction of the steering wheel 101: plus corresponding to the clockwise turn and minus corresponding to the counterclockwise turn) of the detected torque is judged by a polarity judging circuit 150 which generates a direction signal C of H level when the polarity is plus (clockwise turn) or of L level when it is minus (counterclockwise turn) and applies to an AND gate 182.

Similarly, the torque detection signal of the second strain gage unit 143 is processed by an amplifier 148 and an absolute value circuit 149, so that a signal (positive polarity) indicative of the absolute value of the detected torque is applied to an input channel CH3 of the A/D converter 146. The polarity of the torque detection signal is judged by a circuit 179, whereby a direction signal D of H level when the polarity is plus (clockwise turn) or of L level when it is minus (counterclockwise turn) is applied to an AND gate 183.

The signal (positive/negative) indicative of the torque detected by the first strain gage unit 140 and the signal (positive/negative) indicative of the torque detected by the second strain gage unit 143 are applied to a differential amplifier 151, and a signal (positive/negative) indicative of the difference of these two signals is applied to comparators 152 and 153. The correlation between the signal indicative of the difference and the outputs of the comparators 152 and 153 is as follows:

(1) When the level of the signal indicative of the difference is not smaller than an upper limit level UL (positive), the output of the comparator 152 is H and the output of the comparator 153 is L (the difference value is too large: abnormal).

(2) When the level of the signal indicative of the difference is smaller than the upper limit level UL, but in excess of a lower limit level LL (negative), both the outputs of the comparators 152 and 153 are L (the difference value is small: normal).

(3) When the level of the signal indicative of the difference is smaller than the upper limit level UL and not larger than the lower limit level LL, the output of the comparator 152 is L and the output of the comparator 153 is H (the difference value is too large: abnormal).

The outputs of the comparators 152 and 153 are applied via an OR gate 154 to the S input end of a flip-flop 155. This flip-flop 155 is supplied at its R input end with a pulse when a power source (Vc) is switched ON and thereby reset at the rising edge of that pulse to produce a Q output of L level and a $\overline{Q}$ output of H level. As an H (level) signal (indicative of abnormality) is applied to the S input end of the flip-flop 155, it is reset at the rising edge of the H signal to switch the Q output from L to H and the $\overline{Q}$ output from H to L.

The signal A which is the $\overline{Q}$ output is applied to the AND gate 159.

Accordingly, when the signal indicative of the difference between the signal indicating the torque detected by the first strain gage unit 140 and the signal indicating the torque detected by the second strain gage unit 143 is within a predetermined range of from LL to UL, that is, when the forgoing item (2) holds, the Q output of the flip-flop 155 is L, the $\overline{Q}$ output is H, the signal A ($\overline{Q}$) applied to the AND gate 159 is H, and if the micro processor 147 is directing the relay 161 to turn ON (auxiliary torque apply-directive:power steering mode-directive), the motor 108 is energized.

When the signal indicative of the difference is outside the predetermined range of from LL to UL, namely, when the foregoing item (1) or (3) holds, the Q output of the flip-flop 155 is H, the $\overline{Q}$ output is L, and the signal A ($\overline{Q}$) applied to the AND gate 159 is L, accordingly, even when the micro processor 147 is directing the relay 161 to turn ON (auxiliary torque apply-directive:-power steering mode-directive), the output of the AND gate 159 is L, the relay 161 is not energized, and hence the motor 108 is not energized. As the steering wheel 101 is turned, in response thereto the output shaft 121 is rotated and owing to this rotation the rotor of the motor 108 is mechanically rotated. Thus, a steering force is needed stronger than that necessary in a steering system with no power support by a strength required for causing idle rotation of the rotor.

Since the Q output of the flip-flop 155 is applied to an OR gate 156 and the micro processor 147, when the signal indicative of the difference is outside the predetermined range of from LL to UL, namely, when the foregoing item (1) or (3) holds, the Q output is H, thus, an LED (a light emitting diode) driver 157 is energized, and hence a light emitting diode 158 turns ON. This light emitting diode 158 is equipped in a panel disposed in front of a driver's seat. Also when the micro processor 147 judges that the signal indicative of the difference is outside the predetermined range, it applies the H (level signal) to the OR gate 156, hence, the light emitting diode 158 turns ON.

A comparator 181 compares the absolute value of the signal indicating the torque detected by the first strain gage unit 140 and the absolute value of the signal indicating the torque detected by the second strain gage unit 143. The comparator 181 generates a signal of H level when the former absolute value is not smaller than the latter, or of L level when the former is smaller than the latter, and applies that signal to an AND gate 182 without alteration and to an AND gate 183 through inversion. The outputs of the AND gates 182 and 183 are applied through an OR gate 184 to the micro processor 147. The meaning of the output B of the OR gate 184 is as follows:

(4) When the absolute value of the torque detected by the first strain gage unit 140 is not smaller than the absolute value of the torque detected by the second strain gage unit 143, the output of the comparator 181 is H, the AND gate 182 is ON, and the AND gate 183 is OFF, thus, the output C of the polarity judging circuit 150 is applied to the OR gate 184, and hence the output B of the OR gate 184 is identical to the signal C. Accordingly, the signal C indicating the polarity of the torque detected by the first strain gage unit 140 is applied to the micro processor 147.

(5) When the absolute value of the torque detected by the first strain gage unit 140 is smaller than the absolute value of the torque detected by the second strain gage unit 143, the output of the comparator 181 is L, the AND gate 182 is OFF, and the AND gate 183 is ON, thus, the output D of the polarity judging circuit 179 is applied to the OR gate 184, and hence the output B of the OR gate 184 is identical to the signal D. Accordingly, the signal D indicating the polarity of the torque detected by the second strain gage unit 143 is applied to the micro processor 147.

As will be described hereinafter, when the difference between the torque detected by the first strain gage unit 140 and the torque detected by the second strain gage unit 143 is within the predetermined range of from LL to UL (normal), the average of the two torques detected is computed and used as a detection torque value. Since this average is computed after both the absolute values of the detected torques are A/D-converted, the polarity of the detected torque is unknown. Since it is microscopically possible that the polarity of one detected torque differs from the other, the polarity of the average (the polarity of the detected torque, corresponding to the rotation direction of the steering wheel 101) is necessary to be determined. In view of the foregoing, in the embodiment described above, one of the signals C and D indicating the polarities of the two detected torques, which one corresponds to the one larger in absolute value than the other, is selected and applied to the micro processor 147, as described in the foregoing items (4) and (5).

The voltage across the resistor 172 is smoothed and amplified for level calibration in an amplifier circuit 173 and applied to a channel CH1 of the A/D converter 146. While supplying a relay(161)-ON signal to the AND gate 159, the micro processor 147 directs the A/D converter 146 to A/D-convert the input of the channel CH1 at a predetermined timing, reads the voltage of the resistor 172, i.e. the smoothed value of the current flowing through the motor 108 in the digital form, compares the thus read data and an average current value determined by the duty directive data, Hd and Ld, currently presented to judge whether the motor 108 and energizing circuit 180 are abnormal (wire-disconnection or over-current) or not, and when they are abnormal, causes the relay 161 to turn ON (resulting in no auxiliary torque given by the motor 108), applies the H to the OR gate 156, and then terminates its control action. Incidentally, after termination of the control action the micro processor 147 cannot be reset unless a key switch 178 is once turned OFF and then turned ON again.

With a reed switch 174 which is opened and closed in response to rotation of a permanent magnet gear 175 fixed to a car speed meter cable (a wire rotatable in interlinked relation with the rotation of the output shaft of the reduction gear unit), is connected an amplifying waveform-shaping circuit 176, from which a pulse (a car speed detection pulse) of L level when the reed switch 174 is closed and of H level when it is opened is applied to the interrupt-1 input port of the micro processor 147.

To a constant voltage source circuit 177 is applied the voltage of the battery 162 via the key switch 178, which circuit 177 supplies a predetermined constant voltage to respective portions of the circuit system shown in FIG. 15.

FIG. 16 illustrates the main control process of motor-driven power steering of the micro processor 147.

As the power is switched ON (as the key switch 178 is closed and the voltage source circuit 177 generates the predetermined constant voltage), the micro processor 147 initializes input/output ports, registers, timers, flags, etc. That is, these are set to the conditions required in the standby state. As the result of this initialization, the outputs to the AND gate 159 are changed to L, and the relay 161 (being originally OFF) is set to OFF (step S2, hereinafter the word "stop" is omitted in parentheses).

Then, the micro processor 147 alllows interruption (S3). As a result, an interrupt process is performed each time an input to interrupt ports changes from H to L. One of the interrupt ports is named Interrupt-1. The interrupt process performed when the input to that port changes from H to L is illustrated in FIG. 18.

Figure 18:
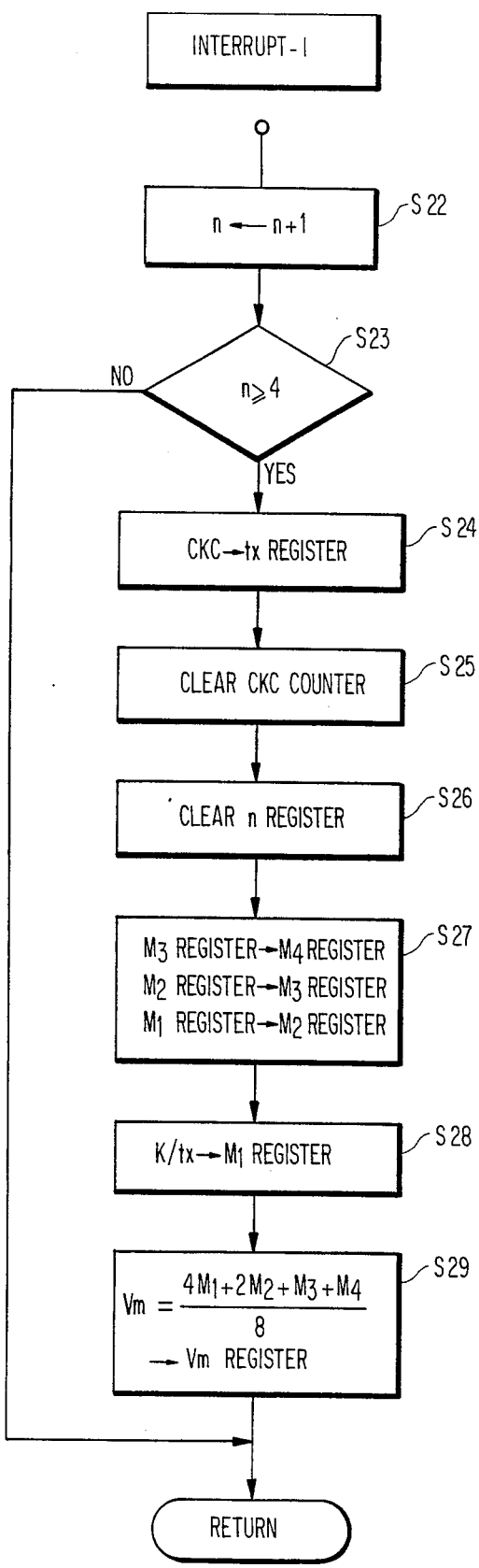
FIG. 18 is a flowchart showing the interrupt processing operation of the micro processor 147.

Describing the process of Interrupt-1 with reference to FIG. 18, first, the processor renews or increments by 1 (one) the contents n of an n register for counting the number of incomings of Interrupt-1 (S22), and checks whether the contents n of the n register is equal to 4 or not (S23). When not reaching 4, control returns to the main routine. When having reached 4, the processor stores the count data CKC of a clock pulse counter (a program counter) CKC in a tx register (S24), and clears the counter CKC (S25). As a result, the counter CKC will count up again from 0 (zero). The contents tx of the tx register correspond to an elapsed time during which 4 car-speed detection pulses come successively. Then, the processor clears the n register (S26). Then, it moves the contents of an $M_3$ register for computing the average of car speed to an $M_4$ register, the contents of an $M_2$ register to the $M_3$ register, and the contents of an $M_1$ register to the $M_2$ register (S27), and stores K/tx in the $M_1$ register (S28). Where tx is the contents of the tx register, K is a constant which is a conversion constant used for getting the frequency of car speed detection pulses, i.e. the car speed, from 4 periods (tx) of the output pulse of the shaping circuit 176, and K/tx is a car speed data. Then, the processor computes the average car speed $$Vm = (4M_1 + 2M_2 + M_3 + M_4)/8,$$

stores the above in a Vm register (S29), and returns to the main routine. Where $M_1$, $M_2$, $M_3$, and $M_4$ are the contents of the $M_1$ register, $M_2$ register, $M_3$ register, and $M_4$ register, respectively. The purpose of getting a weighted mean is to reduce a possibility that an erroneous car speed is detected owing to noise and the like.

Through the foregoing interrupt-1 process, the car speed data is always stored in the Vm register, and this car speed data is updated each time of generation of 4 successive car speed detection pulses.

Refer again to FIG. 16. As interruption is allowed (S3), the micro processor 147 sets a T timer for determining a period of reading the detected torque (S4), directs the A/D converter 146 to A/D-convert the channel-CH2 input, reads the thus converted data (the absolute value of the torque detected by the strain gage unit 140: Tq1) and stores in a Tq1 register (S5), successively, directs to A/D-convert the channel-CH3 input, and reads the thus converted data (the absolute value of the torque detected by the strain gage unit 143: Tq2) and stores in a Tq2 register.

Then, the processor computes the absolute value Td of the difference of the detected torques Tq1 and Tq2 (S7), and compares the above and a set value Ta (S8). Where Ta is roughly equivalent to (UL−LL)/2, but not necessary to be purely equal thereto.

When Td < Ta, the difference between the absolute value Tq1 of the torque detected by the first strain gage unit 140 and the absolute value Tq2 of the torque detected by the second strain gage unit 143 is smaller than the set value Ta (normal), thus, the processor turns OFF the light emitting diode 158 (S9), and computes the average of the absolute values of the detected torques $$Tm = (Tq1 + Tq2)/2$$

(S10).

In the internal ROM of the micro processor 147 are stored duty directive data Hdo and Ldo being assigned to respective absolute values of the detected torque Tm and auxiliary torque apply rates Kv being assigned to respective values of the car speed. These values are qualitatively illustrated in FIGS. 17a and 17b. Incidentally, since digital data are stored in the ROM, the curves of FIGS. 17a and 17b take the shape of a step practically.

In step S11, the micro processor 147 reads out the data Hdo and Ldo corresponding to the computed Tm from the internal ROM, reads out the data Kv corresponding to the contents Vm of the Vm register from the internal ROM, computes Hd=Kv·Hdo, stores this Hd in low-order 4 bit positions of a PWM register, and stores the read-out Ldo in high-order 4 bit positions of the PWM register. Then, through referring to the output B of the OR gate 184 (S12), the processor sets the data of directing normal rotation (the rotation direction of the motor 108 to drive the output shaft 121 in the clockwise direction) in the direction register when the output B is H (the detected torque is positive: the steering wheel 101 is being driven in the clockwise direction) (S13), or sets the data of directing reverse rotation (the rotation direction of the motor 108 to drive the output shaft 121 in the counterclockwise direction) in the direction register when the output B is L (the detected torque is negative: the steering wheel 101 is being driven in the counterclockwise direction) (S14). Then, the processor turns ON the relay 161 (sets the H in the output port to the AND gate 159) (S15), sets the contents of the PWM register in output ports OP1–OP8, and sets the contents of the direction register in output ports OP9 and OP10 (S 16). Assignment of the contents of the PWM register and the contents of the direction register to the output ports is illustrated in FIG. 17c. Owing to the foregoing output setting (S16), "Hd>0" holds when the Tm is not smaller than a predetermined value in the neighborhood of 0 (zero), and the current is caused to flow through the motor 108 at the duty of Hd/(Hd+Ld), as a result, the motor 108 is driven to rotate the output shaft 121 in the direction identical to that in which the steering wheel 101 intends to rotate. The output torque of the motor 108 is proportional to Hd/(Hd+Ld). That is, the output torque takes a value corresponding to the detected torque Tm and the car speed Vm, namely, the larger the detected torque Tm and the lower the car speed Vm, the larger the torque the motor 108 applies to the output shaft 121. After setting the contents of the PWM register and the direction register in the output ports OP1–OP10 (S16), the micro processor 147 checks whether the T timer has run out or not (S17). That is, it is checked whether the elapsed time from step S4 is larger than "T". If timer runout (a lapse of T) is detected, control is returned to step S4, whereas if not, return to step S4 is deferred until timer runout occurs.

In this way, the processes of steps S4–S8 and S9–S17: reading the detected torques (S5, S6), computing the difference of the detected torques (S7), judging abnormality (S8), computing the average of the detected torques (S10), computing the energizing current duty of the motor 108 (S11), and directing energization of the motor (S12–S16), are repeatedly performed.

When the difference Td between the absolute values Tq1 and Tq2 of the detected torques is not smaller than the set value Ta, or when the Td has exceeded the Ta, the processor advances from step S8 to S18, namely, turns OFF the relay 161 to disconnect the motor 108 from the source 177, applies the H to the OR gate 156 to turn ON the light emitting diode 158 (S19), initializes the PWM register, and sets the contents (indicative of 0 (zero)) of the PWM register in the output ports (S20). As a result, the output of the pulse width modulator 171 also becomes L, and the transistors 163 and 164 are confined to OFF. Then, the micro processor 147 checks the Q output of the flip-flop 155 (S21) and if it is H (abnormality is detected also by the stop directing circuit 190), waits there until the Q output becomes L. That is, the processor stands by while stopping the steering auxiliary torque apply control. When the Q output of the flip-flop 155 is L (normality is detected by the stop directing circuit 190), the processor advances from step S21 to S16, passes through steps S16 and S17, and returns to step S4. In this case, the processor goes at the period T through steps S4–S8, S18–S21, S16, S17, and S4, hence, the motor 108 is not energized. If Td<Ta is realized during the circulation of control as above, control returns to the normal condition, and if the Q output of the flip-flop 155 becomes H, the processor stands by at step S21, whereby the motor 108 is kept in the deenergized state.

The operation and advantages of the embodiment described above will now be summarized.

(I) When the difference (positive/negative, difference =zero corresponds to the earth level of the apparatus) between the torque detection signal (positive/ negative, torque=zero corresponds to the earth level of the apparatus) given from the first strain gage unit 140 and the torque detection signal (positive/negative, torque=-zero corresponds to the earth level of the apparatus) given from the second strain gage unit 143 is within the predetermined range of from LL (negative) to UL (positive), the Q output of the flip-flop 155 is L and the $\overline{Q}$ output is H, thus, energization of the motor 108 is controlled by the micro processor 147.

The micro processor 147 reads at the period T the absolute value Tq1 of the torque detection signal given from the first strain gage unit 140 and the absolute value Tq2 of the torque detection signal given from the second strain gage unit 143, computes the difference Td between these absolute values, takes when the Td is not larger than the set value as normal, and powers the motor 108 at the duty of Hd/(Hd+Ld) determined by the average Tm of Tq1 and Tq2 and the car speed Vm. The rotation direction of the motor 108 is determined by the output of the comparator 181, that is, when Tq1 is not smaller than Tq2, the rotation direction depends on the polarity of the detection signal given from the first strain gage unit 140, namely, the clockwise direction results from the polarity being positive, or the counterclockwise direction results from it being negative. When Tq1 is smaller than Tq2, the rotation direction depending on the polarity of the detection signal given from the second strain gage unit 143 becomes clockwise if the polarity is positive, or counterclockwise if it is negative. The condition that Td is larger than the set value is taken as being abnormal, thus, the processor turns ON the light emitting diode 158, turns OFF the relay 161, and changes the output of the pulse width modulator 171 to L, not to energize the motor 108 (this is the protective action effected when the micro processor 147 has detected abnormality).

(II) When the difference between the torque detection signal given from the first strain gage unit 140 and the torque detection signal given from the second strain gage unit 143 is outside the predetermined range of from LL (negative) to UL (positive), the Q output of the flip-flop 155 is H and the $\overline{Q}$ output is L. Since the AND gate 159 is confined to OFF, the relay 161 is in the deenergized state, so that the motor 108 is disconnected from the source 177, hence, irrespective of the operation of the micro processor 147 the motor 108 is not energized (this is the protective action effected when the stop directing circuit 190 has detected abnormality). Likely to a steering system with no aid of torque, the output shaft 121 is driven to rotate only by a force applied to the steering wheel 101.

Incidentally, in the above state, if the micro processor 147 also detects abnormality (Td≧Ta), it terminates its control action and performs only computation of the car speed (Interrupt-1, FIG. 18) until the stop directing circuit 190 detects normality or the source (the key switch 178) is once switched OFF and then switched ON again.

(III) When at least one of the stop directing circuit 190 and the micro processor 147 detects abnormality on the basis of the foregoing items (I) and (II), the motor 108 is not energized.

(IV) When the difference between the torque detection signal given from the first strain gage unit 140 and the torque detection signal given from the second strain gage unit 143 is outside the predetermined range of from LL (negative) to UL (positive), the stop directing circuit 190 takes this as being abnormal, and hence turns OFF the relay 161.

When the difference Td between the absolute values Tq1 and Tq2 of the detected torques given from the first and second strain gage units 140 and 143 is not smaller than the set value Ta, the micro processor 147 takes this as being abnormal, hence turns OFF the relay 161 and changes the output of the pulse width modulator PWM 171 to L (Hd=0), whereby the transistors 163 and 164 are confined to OFF.

The predetermined range of from LL (negative) to UL (positive) and the set value Ta are set independently, hence, the two do not agree exactly with each other. Of course, the two are set with taking relation to a detection difference not permitted.

Even when there occurs abnormality, such as backlash, vibration, or destruction, not permissible in the torque detecting mechanism composed in combination of the rod 107, elastic plates 138 and 141, strain gage units 140 and 143, output shaft 121, etc., or even when there occurs abnormality, such as partial breaking or short-circuiting of wires, or temperature drift, not permissible in the strain gage units 140 and 143 and the signal processing circuit connected to the former, it is substantially impossible that the first strain gage unit(140) route and the second strain gage unit(143) route generate concurrently the torque detection signals of values whose difference falls within an allowable range. For example, in connection with the temperature drift causing difficulty at high temperatures, elements or circuit blocks have variations and the difference of drift thereamong becomes large with an increase of temperature owing to such variations, thus, it is substantially impossible even under abnormal temperature drift that the torque detection signals of values whose difference falls within an allowable range are generated concurrently.

Therefore, owing to the foregoing abnormality protective action, abnormality of the torque detecting system can be well-judged and the protective action (of terminating energization of the motor 108) dealing with abnormality can take place. The heaviness in steering of the steering wheel with no auxiliary torque added during the low-speed running is markedly larger than the case of the auxiliary torque added, but, such a condition does not accompany a peculiar danger because of the low-speed running. The heaviness in steering of the steering wheel with no auxiliary torque added during the high-speed running is a little larger than the case of the auxiliary torque added. The reason for the above is that since the steering force is originally low at a high speed, the system is designed so as to apply a low auxiliary torque. Accordingly, the safety of car driving cannot be impaired even when the auxiliary torque is not applied by the protective action. At the time of high-speed running, the steering wheel is light in controlling and the direction of the car can be changed swiftly in response to a slight turning of the steering wheel, hence, if there is the aid of an erroneous steering torque, non-intended steering may result to thereby give a large danger. On the contrary, according to the foregoing embodiment, the auxiliary torque is cut off when abnormal, thus, the degree of safety is enhanced, that is, the so-called fail safe scheme is incorporated.

What is claimed is:

1. A torque detector comprising
   a torque-axial displacement converting mechanism for converting a torque applied between an input shaft and an output shaft into an axial displacement,
   a housing for accommodating said torque-axial displacement converting mechanism,
   a cantilever having one end thereof fixed to said housing with the other end thereof supported by said torque-axial displacement converting mechanism, said cantilever being swingable about said one end in opposite directions in response to said axial displacement, and
   at least one pair of strain gages attached to opposite sides of said cantilever, respectively.

2. A torque detector according to claim 1, wherein each side of said cantilever has a pair of said strain gages attached thereto which are connected into the form of a bridge circuit.

3. A torque detector according to claim 1, wherein said strain gage is applied with a dampproofing coating.

4. A torque detector according to claim 1, wherein said input shaft and said output shaft are disposed coaxially.

5. A torque detector according to claim 4, including further a slide member disposed coaxially with said output shaft and slidable in the axial direction of said output shaft.

6. A torque detector according to claim 5, including further bias means for always urging said slide member in the axial direction of said output shaft.

7. A torque detector according to claim 6, wherein said slide member has a flange for supporting one end of said cantilever.

8. A torque detector according to claim 7, wherein said flange is provided over the whole periphery of said slide member.

9. A torque detector according to claim 1, wherein the surface of said cantilever is coated with an insulating layer.

10. A torque detector according to claim 1, wherein said other end of said cantilever has an end member to be supported by said torque-axial displacement converting mechanism.

11. A torque detector according to claim 10, wherein said end member is of the form of a circular cylinder.

12. A torque detector according to claim 10, wherein said end member is of the form of a ball.

13. A torque detector according to claim 1, wherein a plurality of said cantilevers are disposed with respect to said torque-axial displacement converting mechanism and said housing.

14. A motor-driven power steering system using a torque detector comprising
   a torque-axial displacement converting mechanism for converting a torque applied between an input shaft and an output shaft into an axial displacement,
   a housing for accommodating said torque-axial displacement converting mechanism,
   a cantilever having one end thereof fixed to said housing with the other end thereof supported by said torque-axial displacement converting mechanism said cantilever being swingable about said one end in opposite directions in response to said axial displacement, and at least one pair of strain gages attached to opposite sides of said cantilever, respectively.

15. A torque detector comprising:

a torque-axial displacement converting mechanism for converting a torque applied between an input shaft and an output shaft into an axial displacement;

a housing for accommodating said torque-axial displacement converting mechanism;

a plurality of cantilevers each having one end thereof fixed to said housing with the other end thereof supported by said torque-axial displacement converting mechanism;

at least one strain gage attached to each cantilever; and switching means for selectively switching said plurality of cantilevers depending upon the polarity of torque applied to said torque-axial displacement converting mechanism.

* * * * *